Feb. 24, 1959     J. R. KELSALL     2,874,891
CONTAINER AND METHOD OF MAKING SAME
Filed Aug. 24, 1956     5 Sheets–Sheet 1
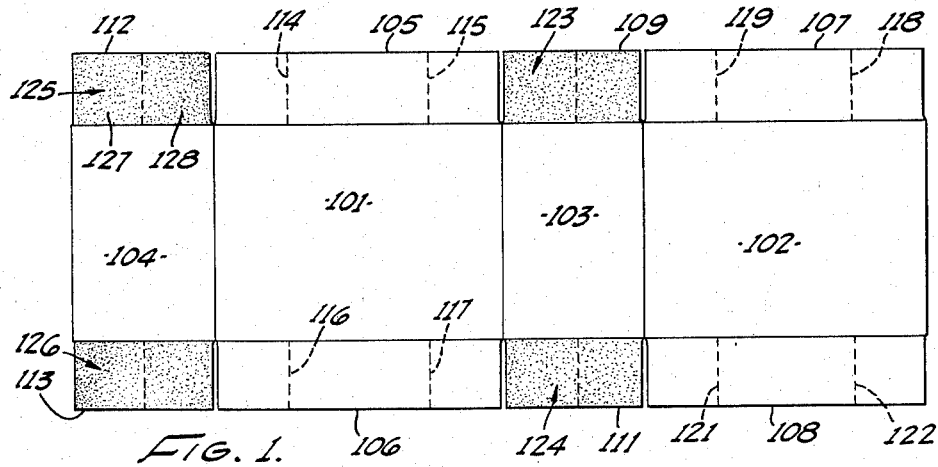
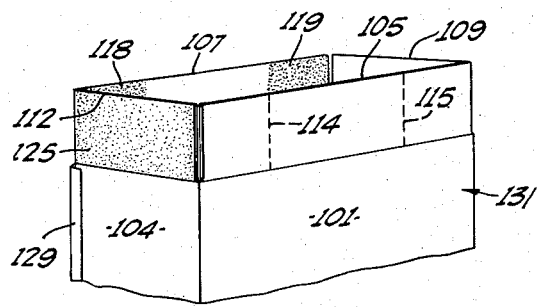
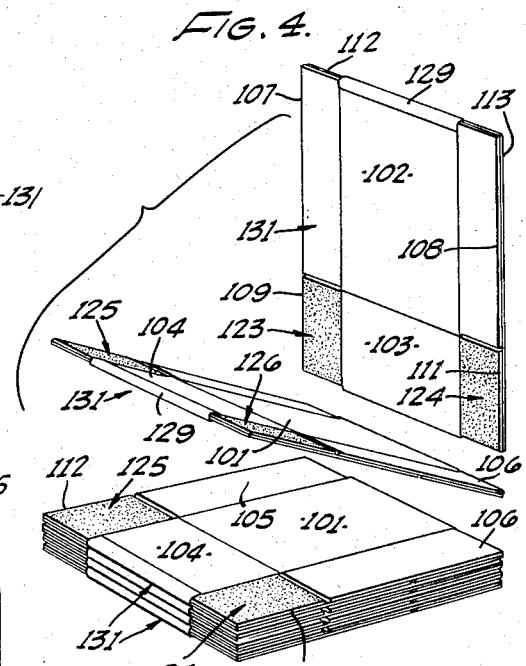
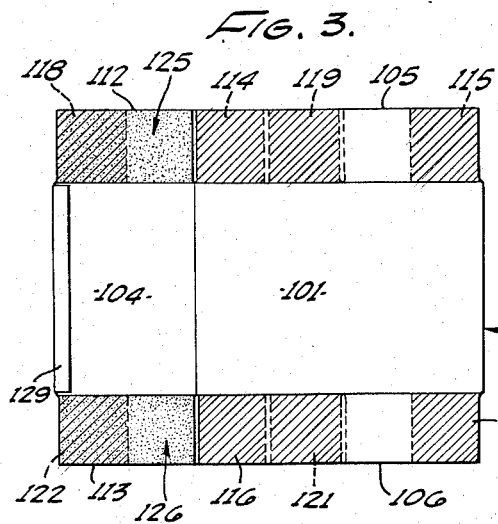
JACK R. KELSALL
INVENTOR.
BY
ATTORNEY Feb. 24, 1959     J. R. KELSALL     2,874,891
CONTAINER AND METHOD OF MAKING SAME
Filed Aug. 24, 1956     5 Sheets-Sheet 2

JACK R. KELSALL
INVENTOR.

BY
ATTORNEY

Feb. 24, 1959    J. R. KELSALL    2,874,891
CONTAINER AND METHOD OF MAKING SAME
Filed Aug. 24, 1956    5 Sheets-Sheet 3
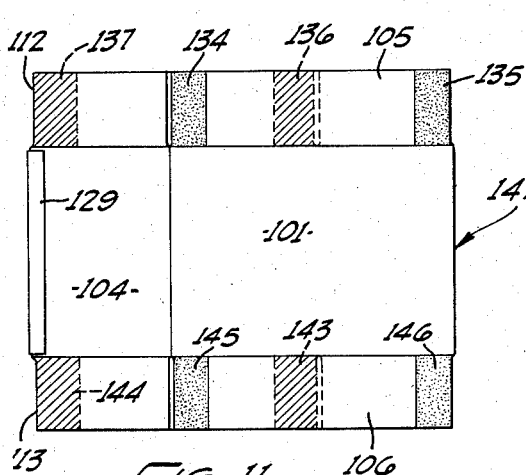
FIG. 11.
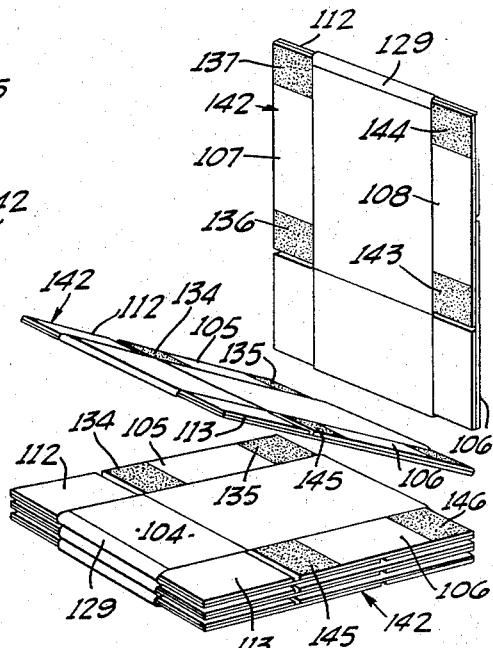
FIG. 10.
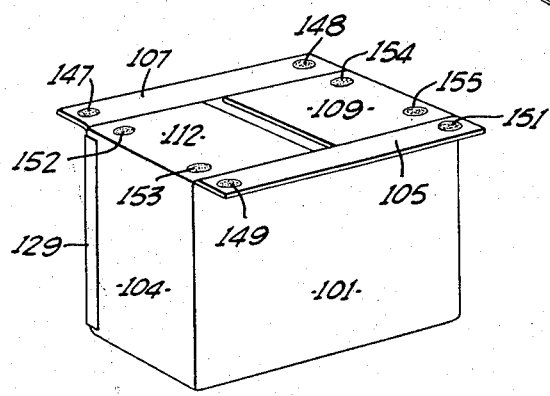
FIG. 12.
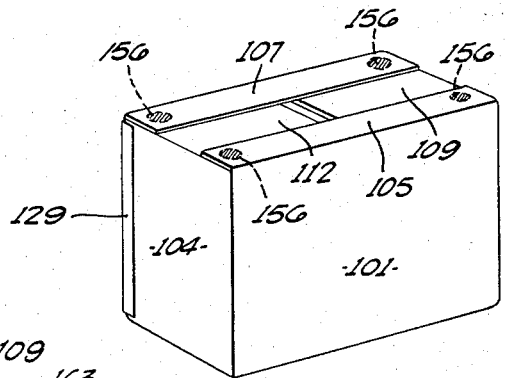
FIG. 13.
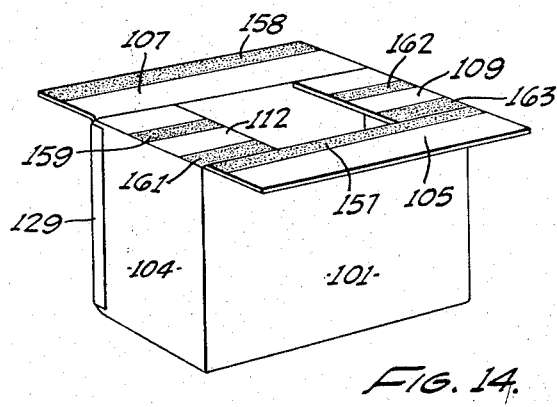
FIG. 14.
JACK R. KELSALL
INVENTOR.
BY 
ATTORNEY Feb. 24, 1959  J. R. KELSALL  2,874,891
CONTAINER AND METHOD OF MAKING SAME
Filed Aug. 24, 1956  5 Sheets-Sheet 4

JACK R. KELSALL
INVENTOR.

BY
ATTORNEY

Feb. 24, 1959 J. R. KELSALL 2,874,891
CONTAINER AND METHOD OF MAKING SAME
Filed Aug. 24, 1956 5 Sheets-Sheet 5

JACK R. KELSALL
INVENTOR.

BY
ATTORNEY

United States Patent Office 2,874,891
Patented Feb. 24, 1959

2,874,891

CONTAINER AND METHOD OF MAKING SAME

Jack R. Kelsall, Bellevue, Wash., assignor, by direct and mesne assignments, to Growers Container Corporation, Salinas, Calif., a corporation of California Application August 24, 1956, Serial No. 606,097

5 Claims. (Cl. 229—37)

This invention relates to rectangular containers having flaps on which pressure-sensitive adhesive coatings may be disposed to facilitate the closures thereof, and more particularly to containers of this type which are collapsible in a manner to prevent the same container or a stack of several individual containers from sticking together, and a method of manufacturing such containers.

This application is a continuation-in-part of copending application Serial No. 559,469, entitled "Collapsible Container and Method of Forming Same," filed by Jack R. Kelsall, January 16, 1956, which is, in turn, a continuation-in-part of abandoned application Serial No. 339,143, entitled "Container of the Corrugated or Solid Fiber or Shipping Case Type and Method of Forming Same," filed by Jack R. Kelsall, February 26, 1953.

Over a considerable number of years past, numerous attempts have been made to devise a container, preferably of the corrugated or solid fiber type, which not only can be secured together with a pressure-sensitive adhesive, but which also can be collapsed in such a manner that it will not stick to itself or stick to other individual containers of a similar type when it is stacked with them. Most of the efforts directed toward solutions to these problems have been devoted to modifying forms of existing containers. This is unfortunate because a standard container, called a regular slotted container, is the most economical to manufacture and use, and for this reason is most generally employed by commercial shipping firms.

The standard container comprises a pair of side walls, a pair of end walls narrower than and foldably connected to the side walls, and a flap hingedly connected from each of the ends of the side and end walls. It generally is unnecessary for both pairs of flaps to meet when the container is closed, i. e. either the side or end flaps may nearly meet, but normally both do not. The container material is thus most economically employed. The standard container, in addition, generally utilizes less material than any other providing the same strength and volume of shipping space. For these reasons, the shipping industry generally employs the regular slotted containers to the exclusion of all others of the prior art, though no satisfactory solution has been found to the problem of preventing these containers from sticking together when they are collapsed and stacked with their flaps coated with a pressure-sensitive adhesive.

The present invention overcomes this stacking problem by arranging the pressure-sensitive adhesive coating on the flaps of a regular slotted container in a certain manner to prevent the flaps of the same container from sticking to itself when it is collapsed. An arrangement is also provided to prevent individual containers from sticking together when a group of them are collapsed and stacked together.

The pressure-sensitive adhesive coatings are employed with a regular slotted container comprising a pair of side walls, a pair of end walls narrower than and foldably connected to the side walls, first and second flaps hingedly connected from the side walls, and third and fourth flaps hingedly connected from the end walls adjacent the first and second flaps. The coating arrangement of the invention then comprises first, second and third pressure-sensitive adhesive coatings on the first, second and third flaps, respectively, all of the coatings being capable of adhering only to each other and not to the container, the first and third coatings being positioned to contact each other when the first and third flaps are overlapped; and a fourth pressure-sensitive adhesive coating on one of the third and fourth flaps, the second and fourth coatings also being positioned to contact each other when the second flap and the flap on which the fourth coating is provided are overlapped, the first and second coatings being spaced apart when the container is collapsed.

Both the first and second coatings are either disposed on the inside or outside of each of the respective flaps. Hereafter, the first and second coatings are described as being on the "same side" of each of the first and second flaps.

Thus, according to the invention the restricted spacings described, and the positions of the coatings on the first and second flaps prevent these flaps on the same container from sticking together when each individual container is collapsed. Further, the positions of the pressure-sensitive adhesive coatings on the third and fourth flaps prevent a group of individual containers so constructed from sticking together when they are collapsed and stacked. An efficient coating arrangement is thus combined with the preferred and economical regular slotted container.

According to another aspect of the invention an economical method is provided to coat a regular slotted container with a pressure-sensitive adhesive. This method includes the steps of folding at least one of the third and fourth flaps inwardly toward the other, folding the first and second flaps outwardly away from each other, and coating a strip of a pressure-sensitive adhesive successively across the first flap, the folded one of said third and fourth flaps and the second flap. The strip must be coated at an angle with respect to a plane of one of the container end walls to cause at least portions of the strip on the first and second flaps to overlie portions on the folded flap, whereby a suitable closure may be made. By employing this method to coat all flaps simultaneously, e. g., with the use of four rollers or sprays or a printing device, it is easily seen that this method makes it possible to use mass production techniques to manufacture the container of the invention and thereby reduce the cost thereof. Moreover, by employing this method one coating pass of a roller or spray may be used to coat three of the twelve pressure-sensitive adhesive strips needed on a regular slotted container and this, in itself, serves to reduce the time required to coat all the flaps of the container.

According to a specific feature of the invention, a method of spraying the pressure-sensitive adhesive coating onto a regular slotted container is provided to prevent unwanted portions of the container from being coated. This result is, of course, desirable in order to prevent the container from being coated in portions that might cause the container to stick to itself or to stick to other containers. The method of the present invention prevents coating unwanted portions of the container by incorporating the steps of folding at least one of the third and fourth flaps inwardly toward the other, folding the first and second flaps outwardly away from each other, and spraying a strip of a pressure-sensitive adhesive successively across the first flap, the folded one of said third and fourth flaps and the second flap at an angle with respect to a plane of one of the end walls to cause at least portions of the strip on the first and second flaps to overlie the strip on the folded one of said third and fourth flaps when the first and second flaps are folded over the folded flap. Thus, in practicing this method of the invention, no portion of a regular slotted container is exposed to a pressure-sensitive adhesive spray except those which an operator will intend to coat. In particular, the folded flap referred to above will shield the inside surfaces of all the end and side walls and lower flaps from the adhesive spray and the first flaps will protect the exterior thereof.

It is therefore an object of the invention to provide a pressure-sensitive adhesive coating arrangement for containers to be collapsed in a manner to prevent the sides of the same container from sticking together and to prevent individual containers stacked together from sticking to each other.

It is another object of the invention to provide a pressure-sensitive adhesive coating arrangement for a regular slotted container.

It is a further object of the invention to provide an economical method of coating a pressure-sensitive adhesive onto the flaps of a regular slotted container.

It is a still further object of the invention to provide a method of spraying a pressure-sensitive adhesive coating on a collapsible container to prevent unwanted portions thereof from being coated and thereby to prevent a container from sticking to itself or to others in a stacked group.

These and other objects and advantages of the present invention will be better understood when considered with the following description taken in connection with the accompanying drawings made a part of this specification, wherein several embodiments are illustrated by way of example. The device of the present invention is by no means limited to the specific embodiments illustrated in the drawings since they are shown merely for purposes of description.

Fig. 1 is a plan view of a sheet of corrugated board cut for size and slit and scored for bending purposes;

Fig. 2 is a fragmentary perspective view showing ends of the fiberboard cuttings;

Fig. 3 is a plan view of a container in a folded and collapsed position with shaded areas indicating the relative positions of facing pressure-sensitive adhesive coatings on contiguous flaps of the container;

Fig. 4 is a perspective view showing how the container, when folded and collapsed, may be stacked with several individual containers of identical construction without the individual ones sticking together;

Fig. 10 is a perspective view of a group of individual boxes made in accordance with construction shown in Figs. 7 and 8 illustrating how they may be stacked together without sticking to each other;

Fig. 11 is a plan view of the box shown in Figs. 7 and 8 in its collapsed position;

Figs. 12 and 13 are perspective views of an opened and closed fiber box made in accordance with another feature of the invention;

Figs. 14 and 15 are perspective views of another embodiment of the invention;

Figure 5:
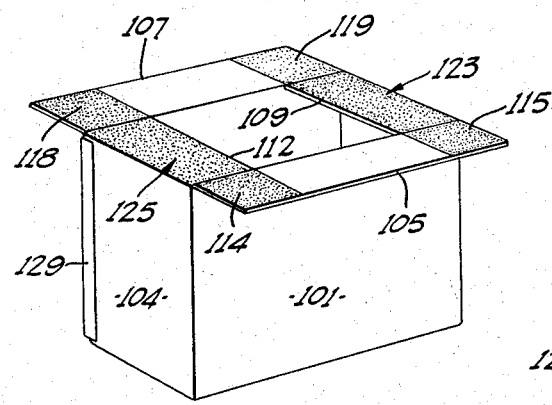
Fig. 5 is a perspective view showing flaps of the box extended preparatory to applying an adhesive.

In the drawings, numbers of reference refer to the same or similar parts throughout the several views. For example, the invention comprises a coating arrangement of a pressure-sensitive adhesive preferably for a regular slotted container. Although the container is shown in different proportions throughout the drawings, the same numbers are applied to the different parts of the container.

The container is shown in Fig. 1 comprising a pair of side walls 101 and 102 with an end wall 103 foldably connected thereto. The container also includes an end wall 104, which is foldably connected to the side wall 101.

A pair of flaps 105, 106 are hingedly connected to the opposite ends of the side wall 101; and flaps 107, 108 are connected to the ends of side wall 102; end flaps 109, 111 are connected to the ends of end wall 103; and flaps 112, 113 are connected to the ends of end wall 104.

The container may, of course, be made of any box material.

A pair of pressure-sensitive adhesive coatings are provided at each end of the flaps connected to side walls 101 and 102. Specifically, coatings 114 and 115 are provided on flap 105; coatings 116 and 117 on flap 106; coatings 118 and 119 on flap 107; and coatings 121 and 122 on flap 108.

The same type coating is also provided on all of the flaps connected to the end walls 103 and 104. Specifically, coatings 123, 124, 125 and 126 are provided on flaps 109, 111, 112 and 113, respectively. It is to be noted that the coatings on the flaps connected from the side walls 101 and 102 cannot be seen in Fig. 1 because of the plan view taken. These coatings are illustrated simply by dotted lines. The coatings on the flaps 109, 111, 112 and 113 are divided into two portions. For example the two portions of the coating 125 are indicated by 127 and 128. It is to be noted that the coatings 127 and 128 will underlie the coatings 114 and 118 on the flaps 105 and 107 when the container is closed. It is to be noted also that the portions 127 and 128 need not conform to the configuration of the coating areas 114 and 118. With the dimensions shown, it is obvious that the coating 125 not only underlies the coated areas 114 and 118 but also underlies a portion of the uncoated portions of the flaps 105 and 107.

A representative specimen of a pressure-sensitive adhesive material which may be employed with the container of the invention is sold commercially as No. W–599 by the American Latex Products Company. A number of other pressure-sensitive glues are on the market, any one of which would serve the purpose although some are naturally better than others.

As shown in Fig. 2, the sides of the side wall 102 and the end wall 104 are connected together by means of a tape 129. Any other convenient means may, of course, be employed. For example, they may be pasted or "stitched" together with staples. As explained previously, the pressure-sensitive adhesive is coated on particular portions of the flaps of the container to prevent a container from sticking to itself when it is collapsed and to prevent individual containers from sticking together when they are collapsed and stacked together. Figs. 2 and 3 illustrate why the embodiment of the invention as shown in Fig. 1 will not stick to itself when it is collapsed in the manner as shown in Fig. 2.

It is obvious from Fig. 1 that the coatings 123 and 125 on the flaps 109 and 112, respectively, will not cause the container to stick to itself because the coatings 123 and 125 are on the outside of the box. As explained heretofore, the coatings 123 and 125 may be referred to as being on the same side of the flaps 109 and 112 respectively since they are both disposed on the outside of these flaps when the box is set up as shown in Fig. 2. Likewise the coatings 118 and 119 are considered to be disposed upon the same side, i. e. the inside of the flap 107 as the coatings 114 and 115 are disposed on flap 105. It is the coatings 114, 115, 118 and 119 that cause concern when the container is collapsed. If the coatings 114 or 115 should overlie either the coatings 118 or 119, the container will stick to itself when it is collapsed.

When the container is collapsed in the manner shown in Fig. 2, it is, therefore, necessary for the coatings 115 and 119 to have widths less than the width of the box in order that they will not overlie the coatings 118 and 114 respectively. The width of the coatings 114 and 118 must not be so great that they overlap each other. In other words, the essence of the invention resides in the fact that the coatings 114 and 115 are both spaced from both the coatings 118 and 119 when the container is collapsed. The respective positions of the coatings 114, 115, 118 and 119 with their corresponding coatings 116, 117, 121 and 122 are shown as shaded areas in Fig. 3. It is to be noted that none of the shaded areas overlap each other and hence the container will not stick to itself.

A group of collapsed containers 131 are shown in Fig. 4. It is obvious from this view that the containers, which are identical to that shown in Figs. 1, 2 and 3, may be stacked together without sticking to each other. It is to be seen that the coatings 123 and 124 on the flaps 109 and 111 will be disposed contiguous to the outsides of the flaps 105 and 106 which are not coated with a pressure-sensitive adhesive. Hence the flaps 109 and 111 will not stick to the flaps 105 and 106 of an adjacent container. Similarly, the coatings 125, 126 on the flaps 112 and 113 will be disposed contiguous to the outside of the flaps 107 and 108. The outsides of the flaps 107 and 108 are not coated with a pressure-sensitive adhesive and thus the flaps 112 and 113 will not stick to the flaps 107 and 108 when the containers are stacked together.

Figure 6:
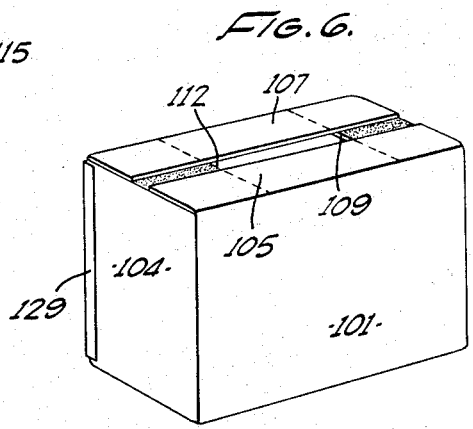
Fig. 6 is a perspective view showing the box when closed.

The manner in which the containers shown in Figs. 1 through 4 are closed is illustrated in Figs. 5 and 6. In Fig. 5 it is again noted that flaps 109 and 112 are coated over a larger area than necessary with the pressure-sensitive adhesive. For ease of manufacturing and economy sake, the coatings 123 and 125 thereon may conform to the configuration of the coatings 114, 115, 118 and 119 on the flaps 105 and 107 which will overlie the coatings on the flaps 109 and 112. Closure of the container is made by folding the flaps 109 and 112 inwardly toward each other as shown in Fig. 5. The closure is completed by folding the flaps 105, 107 over the flaps 109 and 112 as illustrated in Fig. 6. In Fig. 6 the flaps 109 and 112 do not meet, however, this construction is only provided primarily to save material. The flaps 105 and 107 do not meet either, but such a construction may or may not be provided as desired. In certain cases, ventilation of boxes is desirable. For this reason a saving in material may be made without reducing the strength of the closure substantially by providing shortened flaps such as the flaps 105 and 107.

Figure 7:
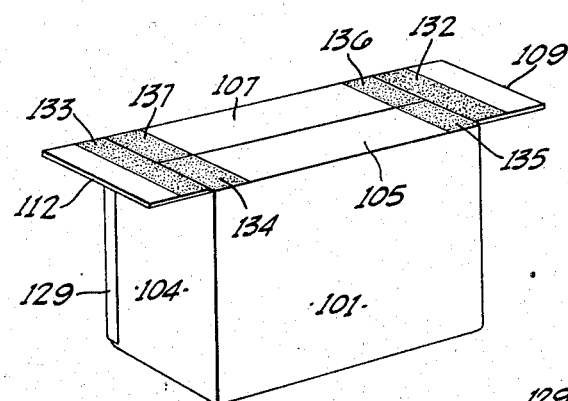
Fig. 7 is a perspective view of a fiberboard box made in accordance with another embodiment of the invention.
Figure 8:
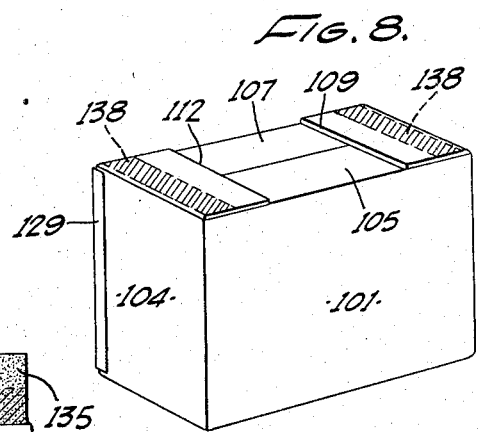
Fig. 8 is a perspective view of the box of Fig. 7 with the flaps thereof closed.

A further embodiment of the invention is shown in Fig. 7 where strips of a pressure-sensitive adhesive 132 and 133 are disposed on the inside of the flaps 109 and 112. Similarly the corresponding strips 134 and 135 are provided on the outside of flap 105 and strips 136 and 137 are provided on the outside of flap 107. It is to be noted that corresponding coatings shown in Figs. 1 through 6 are disposed on opposite sides of all the flaps of a container. The strips 132 and 133 are spaced from the hinged connection of the flaps 109 and 112 to the end walls 103 and 104 and are also spaced from the ends of the flaps 109 and 112. This arrangement is provided merely to illustrate the fact that the spacing on the flaps 109 and 112 at the ends of the box is not particularly critical or material. As stated previously, the essence of the invention resides in the requirement that the strips on the flaps 105 and 107 be spaced from each other when the box is collapsed. This requirement is made even for the construction of the box as shown in Fig. 7 in order to prevent individual containers from sticking together when they are collapsed and stacked. The box in Fig. 7 is closed as illustrated in Fig. 8. Shaded areas 138 represent those areas in which the strips 132 and 133 overlie respectively the strips 135, 136 and 134, 137. The box is closed in a manner similar to that shown in Figs. 5 and 6, i. e. the flaps 105 and 107 are folded over inwardly toward each other as indicated in Fig. 7 and the flaps 109 and 112 are lapped over the flaps 105 and 107 and light pressure is applied to cause the strips 132 and 133 to stick to the strips 135, 136 and the strips 134, 137, respectively.

Figure 9:
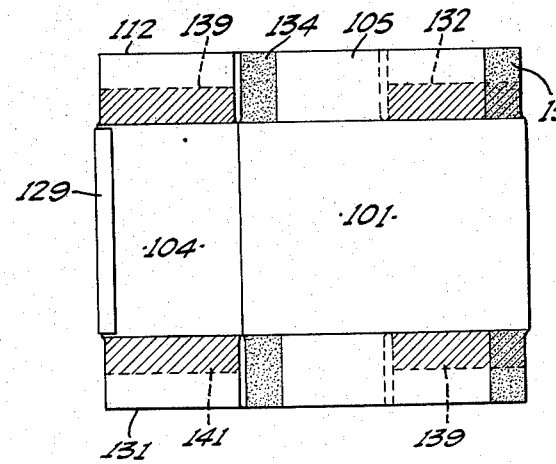
Fig. 9 is a plan view of the box shown in Figs. 7 and 8 with the box collapsed.

Fig. 9 is a plan view of the container shown in Figs. 7 and 8 when collapsed. The strips 132 and 133 on flaps 109 and 112 are shown as shaded areas in Fig. 9. Strips 139 and 141 are provided on flaps 111 and 113 and are also shown as shaded areas. It is to be noted that all the strips 132, 133, 139, 141 are spaced a considerable distance from each other. Thus, under no conditions can the container stick to itself when it is collapsed.

The fact that this container cannot stick to other individual containers of the same type is illustrated in Fig. 10. In Fig. 10 strips 143 and 144 corresponding to strips 136 and 137 are shown disposed on the flap 108. Similarly strips 145 and 146, corresponding to strips 134 and 135, are shown disposed on flap 106. When the containers 142 are collapsed in the manner shown in Fig. 10, it is seen that the strips 137 and 144 will be disposed adjacent to flaps 112 and 113. These flaps have no pressure-sensitive adhesive strips on their outside surfaces. Hence the flaps 112 and 113 will not stick to the strips 137 and 144. The strips 136 and 143 will be positioned between the strips 134, 135 and 145, 146 respectively as will be shown in Fig. 11. Because there is no overlap between the strips 136 and 143 and the strips 134, 135, and 145, 146 individual containers cannot stick together when they are stacked together.

A plan view of one of the containers 142 is shown in Fig. 11 where the respective positions of strips 136, 137, 143 and 144 of an overlying container is shown as shaded areas. The shaded areas 136, 137, 143 and 144 do not overlap the strips 134, 135, 145 and 146. Hence individual containers of this type, when stacked together, cannot stick together. The requirement for this construction is then the same as the container shown in Figs. 1 through 6. Specifically, the shaded areas in both Figs. 3 and 6 are spaced from each other. Regardless of which type of construction is employed, neither of these containers can stick to itself or stick to individual containers of the same type when stacked with them when the pressure-sensitive adhesive coatings or strips on the flaps 105 and 107 are spaced from those on the flaps 106 and 108 when the containers are collapsed.

Another embodiment of the invention is shown in Figs. 12 and 13. This embodiment of the invention illustrates the fact that the dimensions of the flaps 109, 112, 105, 107 are not material. Two spots on each of the flaps are provided with a pressure-sensitive adhesive coating, spots 147, 148 on flap 107, spots 149, 151 on flap 105, spots 152, 153 on flap 112, spots 154, 155 on flap 109. This coating arrangement is provided firstly to illustrate the fact that the coated portions of the flaps 109 and 112 connected to the end walls 103 and 104, respectively, may be provided on isolated areas. The container is closed by folding the flaps 109, 112 inwardly toward each other and then folding flaps 105 and 107 over the flaps 109, 112, as illustrated in Fig. 13. Shaded areas 156 in Fig. 13 represent the overlapping coated areas on each of the flaps which cause the flaps 105 and 107 to stick to the flaps 109 and 112.

Figure 15:
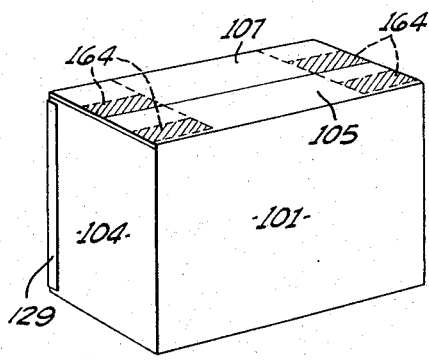
Figure 16:
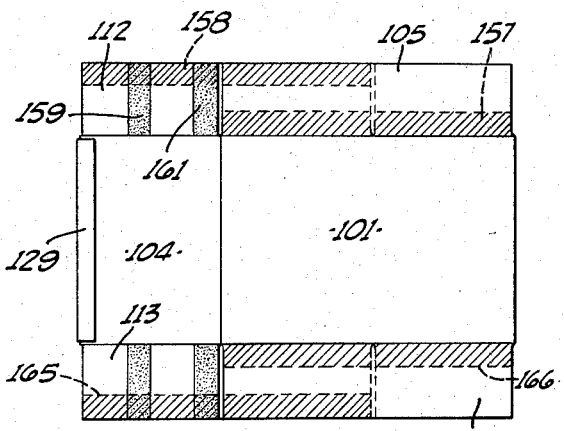
Fig. 16 is a plan view of the box shown in Figs. 14 and 15 with shaded areas illustrating the fact that the box will not stick to itself when it is collapsed.

Another embodiment of the invention is shown in Figs. 14, 15 and 16. Strips 157 and 158 of a pressure-sensitive adhesive coating are provided respectively on the inside of flaps 105 and 107. It is to be noted that the strip 158 is disposed at a position closer to the end of flap 107 than the coating 157 is disposed toward the end of the flap 105. Corresponding coatings are provided on the flaps 109 and 112 to underlie end portions of the strips 157 and 158. Specifically, a strip 159 is provided on the flap 112 to underlie a portion of the strip 158 and a strip 161 is provided to underlie the strip 157. A strip 162 is also provided on the flap 109 to underlie another portion of the strip 158 and a second strip 163 is provided on flap 109 to underlie another portion of strip 157.

The portions of the strips, which overlap when the flaps 109 and 112 are folded inwardly toward each other and flaps 105 and 107 are folded over the top of the flaps 109 and 112, are illustrated as shaded areas 164 in Fig. 15. It is to be noted that the intermediate portions of the strips 157, 158 serve no useful purpose; however, for economy in manufacture it may be desirable simply to coat the whole length of each of the flaps 105 and 107, respectively.

A plan view of the container shown in Figs. 14 and 15 is shown collapsed in Fig. 16 with a strip 165 disposed on the flap 108 not shown in this figure corresponding to the strip 158 on flap 107. A strip 166 is also provided on the inside of the flap 106 corresponding to strip 157 on flap 105. The strips 157, 158, 165 and 166 are shown as shaded areas since they are facing coatings inside the container. It is to be noted that the areas 157, 158, 165 and 166 are isolated and mutually exclusive. Hence, this container cannot stick together when it is collapsed. This container is stacked in a manner similar to the containers 131 shown in Fig. 4. For the same reason they cannot stick together when they are collapsed. That is, the strips on the flaps 109, 111, 112 and 113 will not overlap each other when the containers are stacked in the same way. These strips, on the contrary, will be disposed at opposite corners of the container when it is collapsed.

Figure 17:
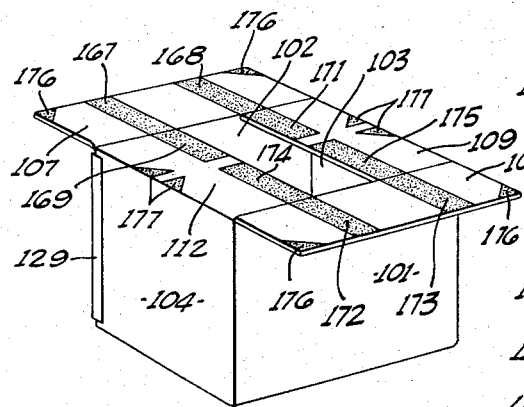
Figs. 17 and 18 are perspective views of still another embodiment of the invention.
Figure 19:
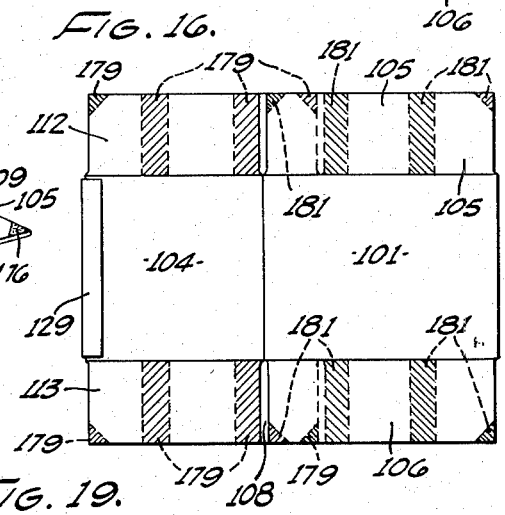
Fig. 19 is a plan view of the box shown in Figs. 17 and 18 illustrating the fact that it will not stick to itself when it is collapsed.
Figure 18:
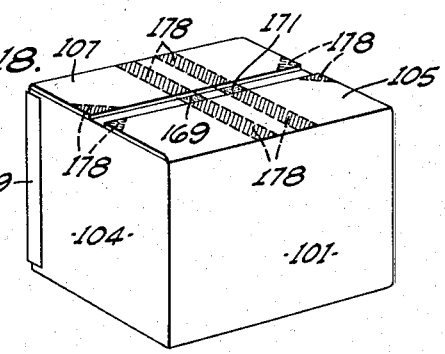

When a container is rectangular in shape but is nearly square, the coatings on the ends or near the ends of the flaps 105 and 107 must be restricted in width. This reduces the strength of the closure that may be made with a pressure-sensitive adhesive coating. A special coating arrangement to solve this problem is shown in Figs. 17, 18 and 19. In particular, four areas on each of the flaps 109, 112, 105 and 107 are coated with a pressure-sensitive adhesive coating. Two coatings 167 and 168 are provided on the flap 107 to overlie coatings 169 and 171 disposed on the outside of flaps 112 and 109, respectively. Two coatings 172 and 173 are provided on the flap 105 to overlie coatings 174 and 175 on flaps 112 and 109, respectively. All of these coatings serve to secure the flaps 105 and 107 to the flaps 109 and 112. However, these coatings are disposed relatively close to the center of the container. For this reason, the corners of the flaps 105 and 107 may tend to peel back and reduce the strength of the closure. A solution to this problem is provided with pressure-sensitive adhesive coatings 176 on each corner of the flaps 105 and 107. Corresponding coatings 177 are disposed on the flaps 112 and 109 to underlie the coatings 176 when the flaps 105 and 107 are folded over the flaps 109 and 112. When a closure is made in this manner, the overlying coated areas thereby created are indicated as shaded areas 178 in Fig. 18.

A plan view of the container shown in Figs. 17 and 18 is shown in Fig. 19. The shaded areas are employed to denote pressure-sensitive adhesive coatings facing each other when the container is collapsed. It is to be noted that in this figure no shaded area overlaps another. Hence, the container will not stick to itself when it is collapsed. For purposes of clarity, the shaded areas 179 denote the pressure-sensitive adhesive coatings on the flaps 107 and 108. The shaded areas at 181 denote the pressure-sensitive adhesive coatings on the flaps 105 and 106.

The embodiment of the invention shown in Figs. 17, 18 and 19 will not stick to other similar containers when a group of such containers are stacked together. This is true for the same reason that the stack of containers in accordance with the embodiment of the invention shown in Figs. 1 through 6 will not stick together.

Figure 20:
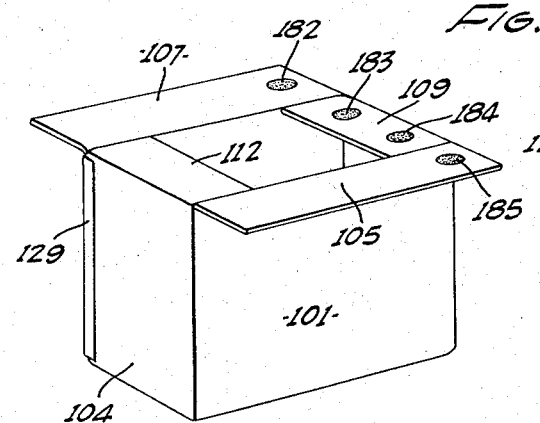
Figs. 20 and 21 are perspective and plan views, respectively, of a fiberboard box made in accordance with still another feature of the invention.
Figure 21:
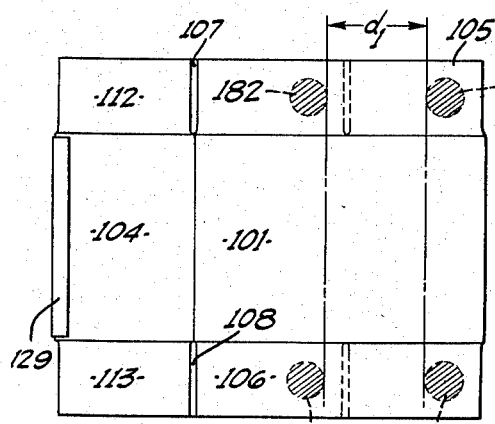

An embodiment of the invention shown in Figs. 20 and 21 comprises the container with a coating 182 on flap 107 to overlie coating 183 on flap 109 and a coating 185 on flap 105 to overlie a second coating 184 on flap 109. It is to be noted that only one end of the box must necessarily be provided with the pressure-sensitive adhesive coatings. The critical spacing required according to this embodiment of the invention is illustrated at $d_1$ in Fig. 21, where the container is shown in plan view. Coating 186 is provided on the inside of flap 108 and coating 187 is provided on the inside of flap 106. It should be noted that the width of the coatings 185 and 187 must not be so large as to overlap the coatings 182 and 186 on flaps 107 and 108, respectively.

Figure 22:
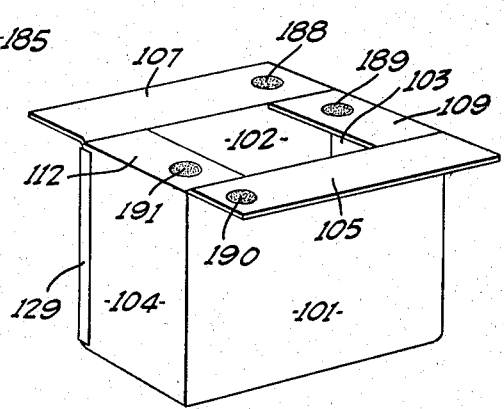
Figs 22 and 23 are perspective and plan views, respectively, of a fiberboard box illustrating still another feature of the invention.
Figure 23:
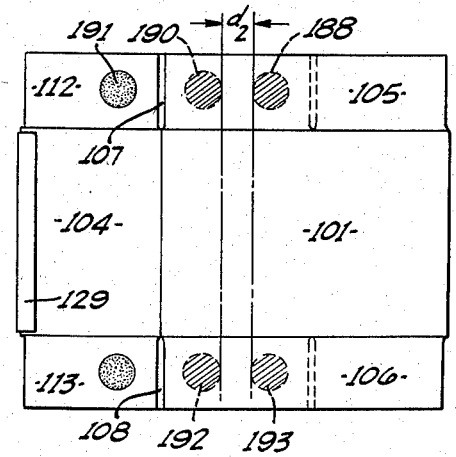

Another embodiment of the invention is shown in Figs. 22 and 23. A coating 188 is provided on one end of the flap 107 to overlie a coating 189 on flap 109 and a coating 190 is provided on the opposite end of flap 105 to overlie coating 191 on flap 112. A coating 192 corresponding with coating 190 is provided on flap 106. A coating 193 corresponding with coating 188 is provided on flap 108. The distance $d_2$ between the coatings 190, 188 and 192, 193, respectively, must be a finite distance. In accordance with the invention the coatings on each of the flaps 105, 107, 106 and 108 are always spaced apart. Thus, the containers shown in Figs. 22 and 23 cannot stick together. The containers shown in Figs. 20, 21 and 22, 23 cannot stick to individual containers of the same type for the same reason that the containers shown in Figs. 1 through 6 cannot stick to individual containers of the same type when they are stacked together.

Figure 24:
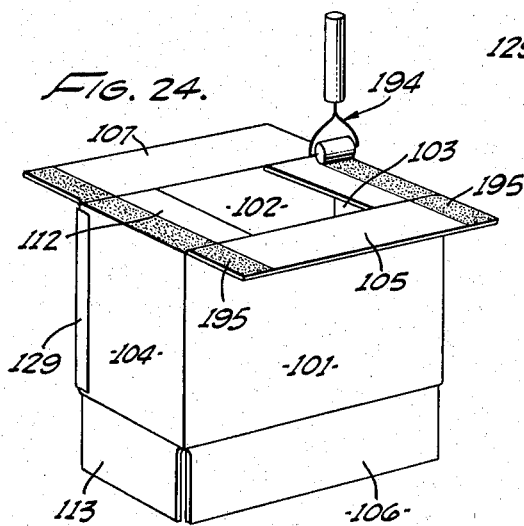
Fig. 24 is a perspective view of a fiberboard box provided with a pressure-sensitive adhesive coating in accordance with one method of the present invention.

The method of the invention includes the first step of folding the flaps 109 and 112 inwardly toward each other and folding the flaps 105 and 107 outwardly away from each other as illustrated in Fig. 24. In this manner all four of the flaps may be coated with the pressure-sensitive adhesive material. For example, by using a roller 194 as shown in Fig. 24, only two passes of the roller 194 need be employed to coat all four of the flaps. This method of coating the flaps is unusually useful for mass production purposes. For example, both ends of the box may be coated simultaneously with two rollers. All the flaps of the box thus may be coated simultaneously. Strips 195 of the pressure-sensitive adhesive material are shown on each end of the box in Fig. 24. It is to be noted that when the strips 195 are equal in width and are disposed at the ends of the flaps 105, 107, that they must be no greater in width than one-half the difference between the length and width of the container. Thus, in this case, the strips on the flaps 105, 107 will not stick to each other when the container is collapsed.

Figure 25:
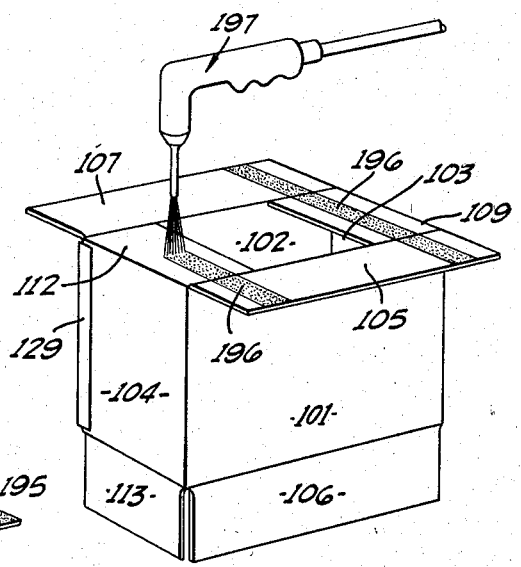
Fig. 25 is a perspective view of a fiberboard box provided with a pressure-sensitive adhesive coating in accordance with a specific feature of the coating method of the present invention.

An alternative method of coating the container with a pressure-sensitive adhesive is shown in Fig. 25. Strips 196 are coated with a spray gun 197. Preferably the axis of the spray is perpendicular to the plane of all four of the flaps 109, 112, 105 and 107. An intermediate portion of the flaps 109 and 112 may be coated to prevent unwanted portions of the interior or exterior of the container from being coated, which coatings might cause the container to stick to itself as to stick to individual containers when they are stacked together. The strips 196 are preferably coated straight in a transverse direction across the flaps parallel to end walls 104 and 103. However, the strips 196 may be coated at an angle as may the strips 195 shown in Fig. 24, the principal requirement being that at least some of the area of the strip on the flaps 196 and 112 must underlie coated areas on each of the ends of flaps 105 and 107.

It will be understood that while specific embodiments of the invention have been disclosed, various changes in structure and the arrangement of parts, and substitution of equivalent coating arrangements for those shown may be made without departing from the true scope of the invention as defined in the appended claims.

What is claimed is:

1. A collapsed, stackable, elongated, rectangular fiberboard box having side and end walls hingedly connected together, the said end walls being narrower than the said side walls, closure flaps extending from and hingedly connected to the top and bottom edges of said side and end walls, the flaps hinged to the side walls being of a length approximately equal to one-half the width of the end walls so as to substantially abut in closed position, the flaps hinged to the end walls having the same length as the flaps of the side walls, and pressure-sensitive adhesive closure securing means applied to all of said flaps, said means comprising strips of pressure-sensitive adhesive, each flap of the end walls having a strip applied to the outer face thereof and extending across the flap with one edge of the strip coinciding and parallel with the hinge line of the flap, and each flap of the side walls having a strip at each end thereof on the inner face thereof with one edge of the strip coinciding and parallel with the respective side edge of the flap, the width of the strips on the side wall flaps being equal and no greater than one-half the difference in length between a side and end wall, and the strips on the end wall flaps having a width at least equal to that of the strips on the side wall flaps.

2. A collapsed, stackable, elongated, rectangular fibreboard box having side and end walls hingedly connected together, the said end walls being narrower than the said side walls, closure flaps extending from and hingedly connected to the said side and end walls, the flaps hinged to the said side walls extending therefrom a distance not more than one half the width of the end walls, the flaps hinged to the end walls extending the same distance therefrom as the flaps extending from the side walls, and pressure-sensitive adhesive closure means applied to a side of all of said flaps, said means comprising strips of pressure-sensitive adhesive, each flap of the end walls having a strip of pressure-sensitive adhesive applied to the outer face thereof and extending across the flap with one edge of the strip coinciding and parallel with the hinge line of the said flap, and each flap of the side walls having a strip of pressure-sensitive adhesive at each end only of said flap and on the inner face thereof with one edge of each of said strips of pressure-sensitive adhesive coinciding and parallel with the respective side edge of the said side wall flap, the width of each of the said strips of pressure-sensitive adhesive along the edges of the inner face of said side wall flaps being less than one half the difference between the length of a said side wall flap and the length of an end wall flap, thereby providing the said rectangular fiberboard box with coated portions on the side wall flaps so dimensioned in relation to the uncoated portions on the opposite side wall flaps that said coated portions of a flap contact only uncoated portions of the opposite flap when the said box is collapsed and to provide further that said box may be stacked with like boxes without the said pressure-sensitive adhesive means coming in sticking engagement with pressure-sensitive adhesive means on other like boxes with which said box is stacked.

3. A collapsed, stackable, elongated, rectangular fibreboard box having side and end walls hingedly connected together, the said end walls being narrower than the said side walls, closure flaps extending from and hingedly connected to the said side and end walls, the flaps hinged to the said side walls extending therefrom a distance not more than one half the width of the end walls, the flaps hinged to the end walls extending therefrom not more than one half the length of the side walls, and pressure-sensitive adhesive closure means applied to a side of all of said flaps, said means comprising strips of pressure-sensitive adhesive, each flap of the end walls having a strip of pressure-sensitive adhesive applied to the outer face thereof and extending across the flap with one edge of the strip extending along the hinge line of the said flap, and each flap of the side walls having a strip of pressure-sensitive adhesive at each end of said flap and on the inner face thereof with one edge of each of said strips of pressure-sensitive adhesive extending along the respective side edge of the said side wall flap, the sum of the widths of said strips of pressure-sensitive adhesive on the ends of said side wall flaps at diagonally opposite corners of said box being no greater than the difference between the length of a side wall flap and the length of an end wall flap thereby providing said collapsed container with pressure-sensitive adhesive closure means that are operable when the said box is in set up position for use and are in non-sealing and non-sticking relationship with other pressure-sensitive adhesive means when the box is collapsed and stacked with like boxes.

4. A collapsed, stackable, elongated, rectangular fibreboard box having side and end walls hingedly connected together, the said end walls being narrower than the said side walls, closure flaps coextensive with and extending from and hingedly connected to the said side and end walls, the flaps of the collapsed box being in face-contacting relationship with one end of one side wall flap in overlapped relationship with one end of the other side wall flap, the flaps hinged to the said side walls extending therefrom a distance not more than one-half the width of the end walls, the flaps hinged to the end walls extending not more than one-half the length of the side walls, pressure-sensitive adhesive closure means applied to a side of all of said flaps, said means comprising coatings of pressure-sensitive adhesive, each flap of the end walls having a coating of pressure-sensitive adhesive applied to the outer face thereof and each flap of the side walls having a coating of pressure-sensitive adhesive on portions of the inner face of the said flap, each of the coated portions of the overlapping ends on said side wall flaps terminating in an edge which is in the said overlapped portion of said side wall flaps and in spaced relationship to the respective end edge of the said side wall flap to which said coating is applied, the said terminal edges of said coated portions defining with said respective end edges of the said side wall flaps, terminal uncoated end portions on said side wall flaps which are in overlapping and contacting relationship with the terminal edge of the opposed pressure-sensitive adhesive coated portions, thereby providing said collapsed rectangular box with pressure-sensitive adhesive closure means that are in non-sealing and non-sticking relationship with other pressure-sensitive adhesive means when the box is collapsed and stacked with like boxes, the said pressure-sensitive means being in operable relationship as closure means when the box is in set-up position.

5. A collapsed, stackable, elongated, rectangular fibreboard box having side and end walls hingedly connected together, the said end walls being narrower than the said side walls, closure flaps coextensive with and extending from and hingedly connected to the said side and end walls, each of the flaps hinged to the said side walls extending therefrom a distance not more than one half the width of the end walls, each of the flaps hinged to the end walls extending therefrom not more than one half the length of the side walls, the said flaps of the collapsed box being in face-contacting relationship with one end of one side wall flap being in overlapped relationship with one end of the other side wall flap, pressure-sensitive adhesive closure means applied to the outer face of each flap of the end walls, the overlapped contacting portion of the aforesaid side wall flaps having bands of pressure-sensitive adhesive on the inner face thereof, one edge of each of said bands extending along the end edge of the overlapping end portion of the side flap to which said adhesive is applied, the width of each band being less than one half the width of the overlapped portion whereby bands of adhesive will be out of face-contacting relationship, thereby providing said collapsed rectangular box with pressure-sensitive adhesive closure means that are in non-sealing and non-sticking relationship with other pressure-sensitive adhesive means when the box is collapsed and stacked with like boxes, the said pressure-sensitive means being in operable relationship as closure means when the box is in set-up position.

References Cited in the file of this patent

UNITED STATES PATENTS

| | | |
|---|---|---|
| 2,078,446 | Grigg | Apr. 27, 1937 |
| 2,217,757 | Lindley | Oct. 15, 1940 |
| 2,521,989 | McPherson | Sept. 12, 1950 |

FOREIGN PATENTS

| | | |
|---|---|---|
| 11,369 | Great Britain | of 1906 |
| 90,016 | Sweden | Aug. 17, 1937 |
| 165,442 | Australia | Feb. 25, 1950 |